United States Patent [19]
Subasingha et al.

[11] Patent Number: 5,671,216
[45] Date of Patent: Sep. 23, 1997

[54] METHOD AND APPARATUS FOR CONTROLLING TRANSMISSION BANDWIDTH BETWEEN CONNECTIONLESS SERVERS

[75] Inventors: Chammika Subasingha; Yoshihiro Watanabe, both of Kawasaki, Japan

[73] Assignee: Fujitsu Limited, Kanagawa, Japan

[21] Appl. No.: 385,147

[22] Filed: Feb. 7, 1995

[30]   Foreign Application Priority Data

Mar. 17, 1994  [JP]  Japan ................................. 6-047299

[51] Int. Cl.⁶ ......................................... H04L 12/26
[52] U.S. Cl. ............................... 370/230; 370/235
[58] Field of Search .......................... 370/17, 58.2, 60, 370/60.1, 79, 84, 94.1, 94.2, 230–237

[56]           References Cited

U.S. PATENT DOCUMENTS 5,040,171  8/1991  Osaki ........................... 370/17
5,319,638  6/1994  Lin ............................. 370/84 X
5,381,404  1/1995  Sugano et al. ................. 370/17 X
5,414,697  5/1995  Osaki .......................... 370/17
5,467,348  11/1995 Fujii et al. .................... 370/17

*Primary Examiner*—Melvin Marcelo
*Attorney, Agent, or Firm*—Helfgott & Karas, P.C.

[57]           ABSTRACT

A method and apparatus control transmission between a plurality of connectionless servers (CLSs) installed to provide connectionless services on a B-ISDN (Broadband aspects of Integrated Services Digital Network). Customer premises equipments (CPEs) are allocated to the respective CLSs so that the sum of the transmission rates requested by the CPEs allocated to each CLS is substantially equal among the CLSs. A traffic shaper is provided on an output highway in each CLS to shape the traffic so that the traffic does not exceed a predetermined transmission rate for each destination.

18 Claims, 8 Drawing Sheets

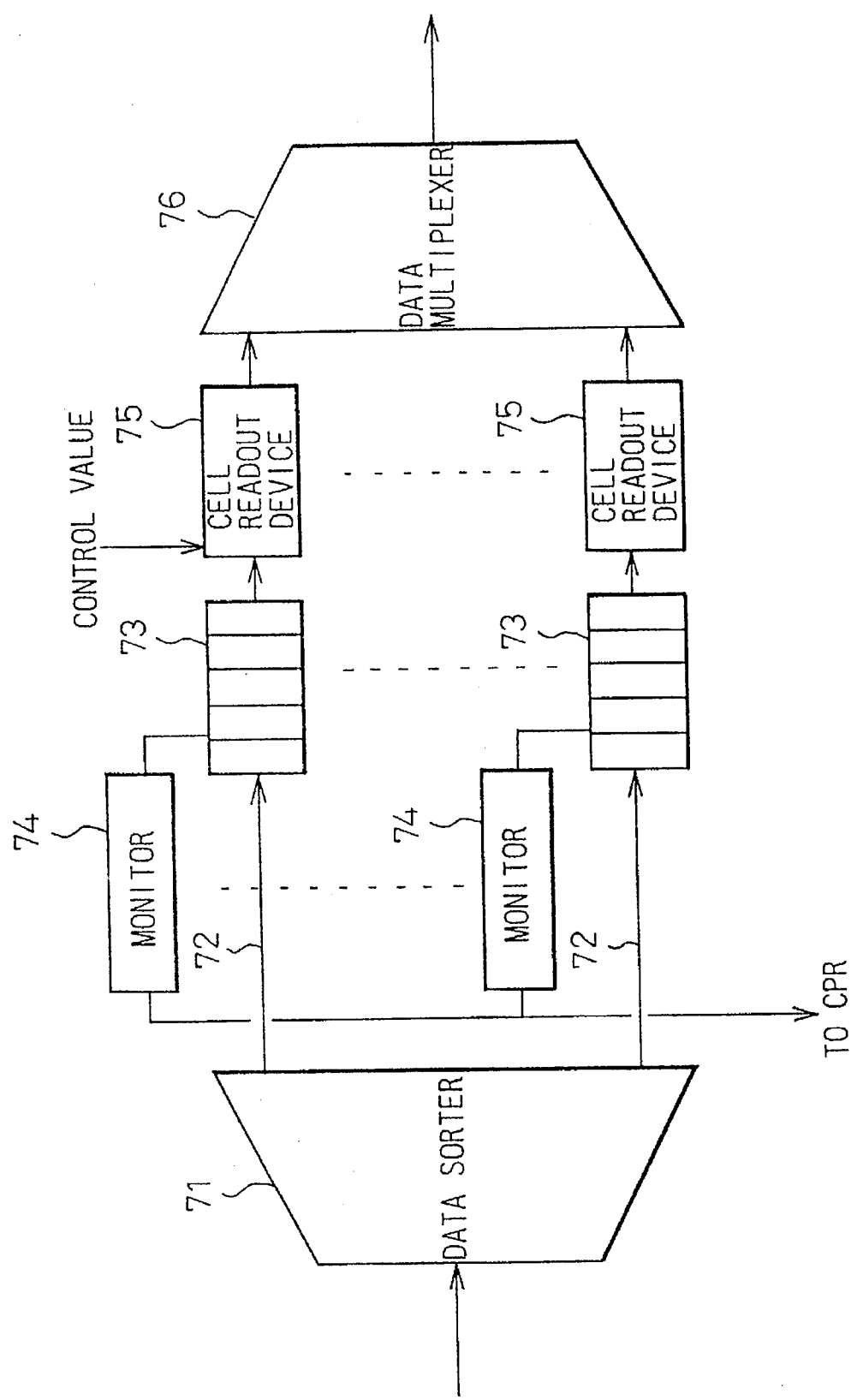

Fig. 7

| TIME | CELL FLOW RATE (Mbps) | | | |
|---|---|---|---|---|
| | CLS1→CLS2 | CLS1→CLS3 | ... | CLS1→CLSi |
| 00~01 | 10 | 05 | | 20 |
| ⋮ | | | | |
| 06~07 | 80 | 100 | | 150 |
| ⋮ | | | | |
| 12~13 | 150 | 250 | | 200 |
| ⋮ | | | | |
| 15~16 | 85 | 90 | | 100 |
| ⋮ | | | | |
| 23~00 | 20 | 10 | | 15 |

METHOD AND APPARATUS FOR CONTROLLING TRANSMISSION BANDWIDTH BETWEEN CONNECTIONLESS SERVERS

BACKGROUND OF THE INVENTION

1. Field of the Invention

The present invention relates to a method and apparatus for controlling transmission bandwidth between a plurality of connectionless servers (CLSs) installed to provide connectionless services on a B-ISDN (Broadband aspects of Integrated Services Digital Network).

2. Description of the Related Art

To support connectionless type services such as a switched multimegabit data service (SMDS) on a B-ISDN, a connection-oriented network, it is proposed to connect CLSs to an ATM (asynchronous transfer mode) switch.

Each terminal (customer premises equipment—CPE) desiring a connectionless service is registered beforehand with a CLS, and at the time of registration or at the beginning of the service, a connection is set up between the CPE and CLS via an ATM switch. When ATM cells sent from the CPE over this connection arrive at the CLS, the CLS restores a higher-layer data unit from them, recognizes the destination address of the higher layer, such as a destination IP (internet protocol) address, contained in the data unit, and reassembles the data unit into cells for transmission to the destination CPE over the connection established between the CLS and the destination CPE.

In an environment where multiple CLSs are installed to provide services to a large number of CPEs, each individual CPE is allocated to one of the CLSs and, to allow different CPEs belonging to different CLSs to communicate with each other, a connection is also set up between the CLSs via an ATM switch. In such an arrangement, as for transmission lines between the CPEs and the ATM switch, since the transmission line between each CPE and ATM switch only carries the traffic between the CPE and CLS, and since traffic parameters such as transmission rate are agreed upon for the connection between the CPE and CLS, the problem of congestion does not occur as long as cells are sent from each CPE within the limits defined by the parameters. As for the transmission lines between the ATM switch and CLSs, on the other hand, the traffic between the CPE and CLS and the traffic between the CLS and other CLSs are carried over the same transmission line. When three or more CLSs are provided, the traffic to and from the CPE and the traffic to and from two or more CLSs are carried over the same transmission line. As a result, even when each CPE is transmitting out cells within the limits of declared values, if the allocation of CPEs to the respective CLSs and/or control of the transmission rate between the CLSs are not properly done, traffic may be concentrated on the transmission channel between a particular CLS and the ATM switch, and congestion may be caused, resulting in cells being discarded at the ATM layer, thus impairing the fairness of distribution of communications resources.

SUMMARY OF THE INVENTION

In a communications system in which a plurality of CLSs are incorporated to provide connectionless services on a B-ISDN, it is an object of the invention to provide a method and apparatus for controlling transmission bandwidth between CLSs to provide the required quality of service while maintaining the fairness of communications.

According to the invention, there is provided a method of controlling data transmission between a plurality of connectionless servers to which terminals requesting a connectionless service are allocated, comprising the steps of: determining the allocation of the terminals so that the sum of the transmission rates requested by the terminals allocated to each connectionless server is substantially equal among the connectionless servers; and setting up a virtual path between each connectionless server and each of the terminals allocated thereto.

According to the invention, there is also provided a method of controlling data transmission between a plurality of connectionless servers to which terminals requesting a connectionless service are allocated, comprising the steps of: determining a control value for a transmission rate at which data can be transmitted between the connectionless servers; and performing traffic shaping between the connectionless servers so that the transmission rate of the data transmitted between the connectionless servers does not exceed the control value.

According to the invention, there is also provided an apparatus for controlling data transmission between a plurality of connectionless servers, to which terminals requesting a connectionless service are allocated, comprising: means for determining allocation of the terminals so that the sum of the transmission rates requested by the terminals allocated to each connectionless server is substantially equal among the connectionless servers; and means for setting up a virtual path between each connectionless server and each of the terminals allocated thereto.

According to the invention, there is also provided an apparatus for controlling data transmission between a plurality of connectionless servers, to which terminals requesting a connectionless service are allocated, comprising: means for determining a control value for a transmission rate at which data can be transmitted between the connectionless servers; and means for performing traffic shaping between the connectionless servers so that the transmission rate of the data transmitted between the connectionless servers does not exceed the control value.

BRIEF DESCRIPTION OF THE DRAWINGS

FIG. 6 is a diagram showing the configuration of a traffic shaper; and

FIG. 7 is a diagram for explaining a further embodiment of the present invention.

DESCRIPTION OF THE PREFERRED EMBODIMENTS

Figure 1:
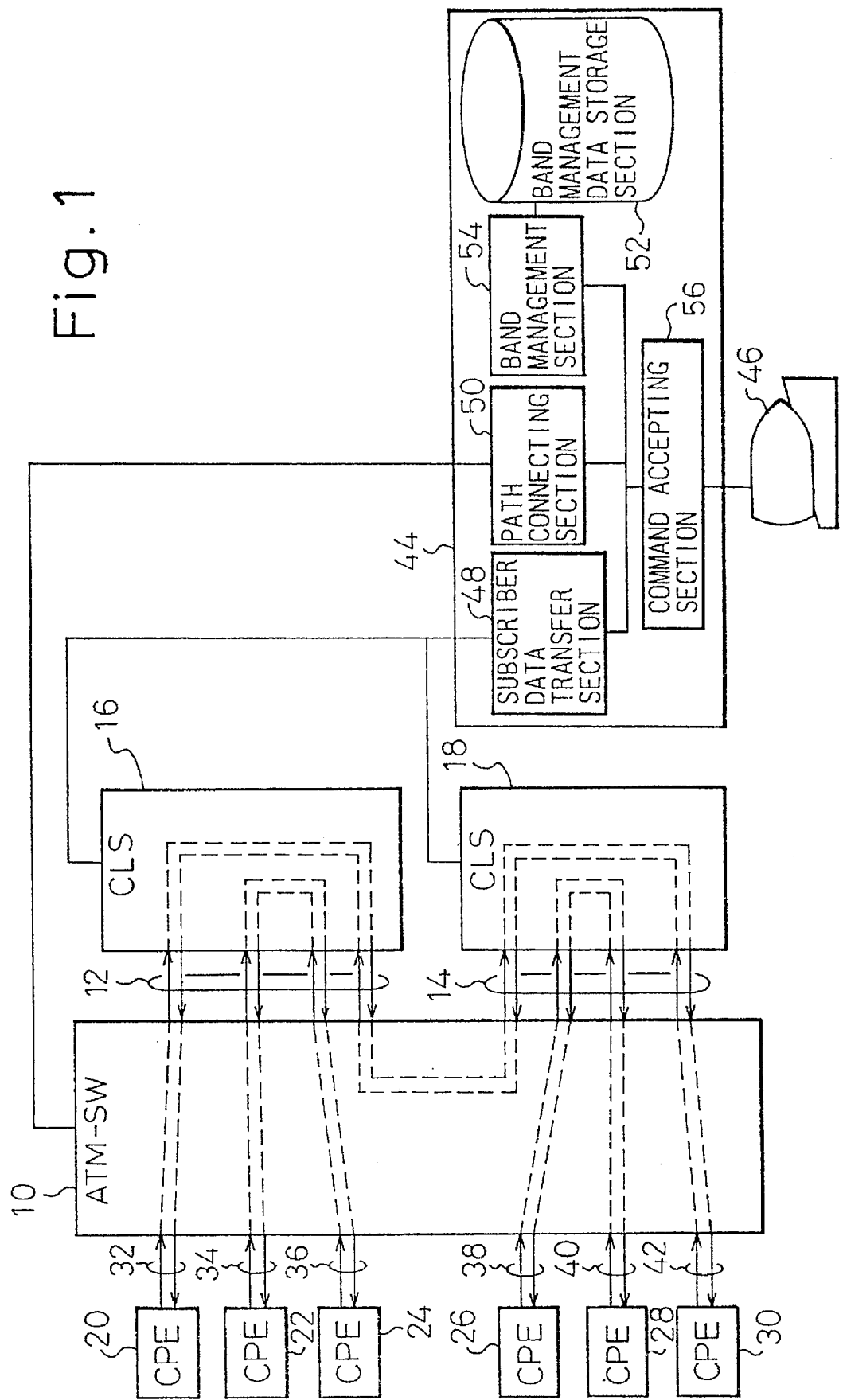
FIG. 1 is a diagram showing an example of a system in which the present invention is embodied.

FIG. 1 is a block diagram showing an example of a system in which the present invention is embodied. In FIG. 1, connectionless servers (CLSs) 16 and 18 are connected to an ATM switch 10 via transmission lines 12 and 14, respectively. Customer premises equipments (CPEs) 20, 22, 24, 26, 28, and 30 are connected to the ATM switch 10 via transmission lines 32, 34, 36, 38, 40, and 42, respectively. When a registration request for a CPE and a transmission rate (for example, 2 Mbps or 40 Mbps) are entered from a console 46, a call processor (CPR) 44 allocates the CPE to one or other of the CLSs for registration and sends the allocation data (subscriber data) to each CLS, and at the time of registration or at the beginning of a service, sets up a connection between the CPE and its associated CLS via the ATM switch 10. The connection between the CLSs 16 and 18 is set up when the system is started.

In the example shown in FIG. 1, CPEs 20, 22, and 24 are allocated to the CLS 16, while CPEs 26, 28, and 30 are allocated to the CLS 18.

The CPR 44 comprises: a subscriber data transfer section 48 for transferring the subscriber data to the respective CLSs; a path connecting section 50 for connecting paths by setting up connections, as necessary, between the CPEs and CLSs and between the CLSs via the ATM switch 10; a band management data storage section 52 for storing data such as the transmission capacity of each transmission line and the transmission rate (band) of each subscriber (CPE); a band management section 54 for determining a control value for the transmission rate of data between the CLSs and the allocation of CPEs to the respective CLSs on the basis of the data stored in the band management data storage section 52 and other data; and a command accepting section 56 for accepting a command entered from the console 46 and for performing processing as directed by the command.

ATM cells, assembled by segmenting a data unit of a higher layer, containing the address of the higher layer such as an IP address, are sent out from a CPE (for example, CPE 20), and arrive at the CLS (for example, CLS 16) to which the CPE belongs via a virtual path set up between the CPE and the CLS. The CLS restores the data unit of the higher layer from the received ATM cells, recognizes the destination address of the higher layer, determines the destination CPE or the CLS to which the destination CPE is allocated by referencing the subscriber data, and reassembles the data unit into ATM cells for transmission to the destination CPE or another CLS. For cells arriving from another CLS, the data unit of the higher layer is also restored in a like manner, the destination address of the higher layer is recognized, the destination CPE is determined by referencing the subscriber data, and the data unit is reassembled into ATM cells for transmission to the destination CPE.

In the example shown in FIG. 1, data originating from the CPE 22 and destined for the CPE 24 is routed along a path established from CPE 22 through to CPE 24 via the ATM switch 10, CLS 16, and ATM switch 10 in this order. Likewise, data originating from CPE 20 and destined for CPE 30 is routed along a path established from CPE 20 through to CPE 30 via the ATM switch 10, CLS 16, ATM switch 10, CLS 18, and ATM switch 10 in this order.

In each of the CLSs 16 and 18, a traffic shaper (not shown) is installed at an intermediate point along a transmission line leading from the CLS to the ATM switch 10. The configuration and operation of the traffic shaper will be described in detail later, but to describe briefly, the traffic shaper has the function of performing traffic shaping by sorting ATM cells by destination and controlling transmission so that it does not exceed the band (transmission rate) determined for each destination by the band management section 54 in the CPR 44.

In the example of FIG. 1, ATM cells are transmitted within the limit of the declared transmission rate (for example, 2 Mbps or 40 Mbps) along any of the transmission lines 32, 34, 36, 38, 40, and 42 between the CPEs and the ATM switch; on the other hand, the transmission lines 12 and 14 between the CLSs and the ATM switch carry not only ATM cells being transported to or from the CPEs belonging to the respective CLSs but also ATM cells being transported between the CLSs. Therefore, if the allocation of CPEs to the respective CLSs and/or control of the transmission rate between the CLSs are not properly done, an unfair situation can occur, even when each individual CPE is communicating at the specified transmission rate, where traffic is concentrated on either one of the transmission lines between the CLSs and the ATM switch, eventually causing cell discarding at the ATM layer, while the other transmission channel is operating with a sufficient margin.

In the first embodiment of the invention, the allocation of each individual CPE to one or other of the CLSs is determined in the following manner. The requested band (for example, 2 Mbps or 40 Mbps) from the CPE requesting the service is stored in the band management data storage section 52. By referencing the requested band from each CPE stored in the band management data storage section 52, the band management section 54 allocates the CPEs to the respective CLSs so that the sum of the requested bands from the CPEs allocated to one CLS is substantially equal to that for the other CLS. The subscriber data transfer section 48 transfers the result of the allocation by the band management section 54 to the respective CLSs along with the IP address and other attribute information of each CPE. The path connecting section 50 sets up a connection between each CLS and each of the CPEs allocated to it. Each CLS controls data transfer from each CPE on the basis of the received subscriber data. In the present embodiment, since the CPEs are allocated to the respective CLSs so that the sum of the requested bands (transmission rates) from the CPEs allocated to one CLS is substantially equal to that for the other CPE, it is expected that the transmission line traffic will also be distributed uniformly between the CLSs.

Figure 2:
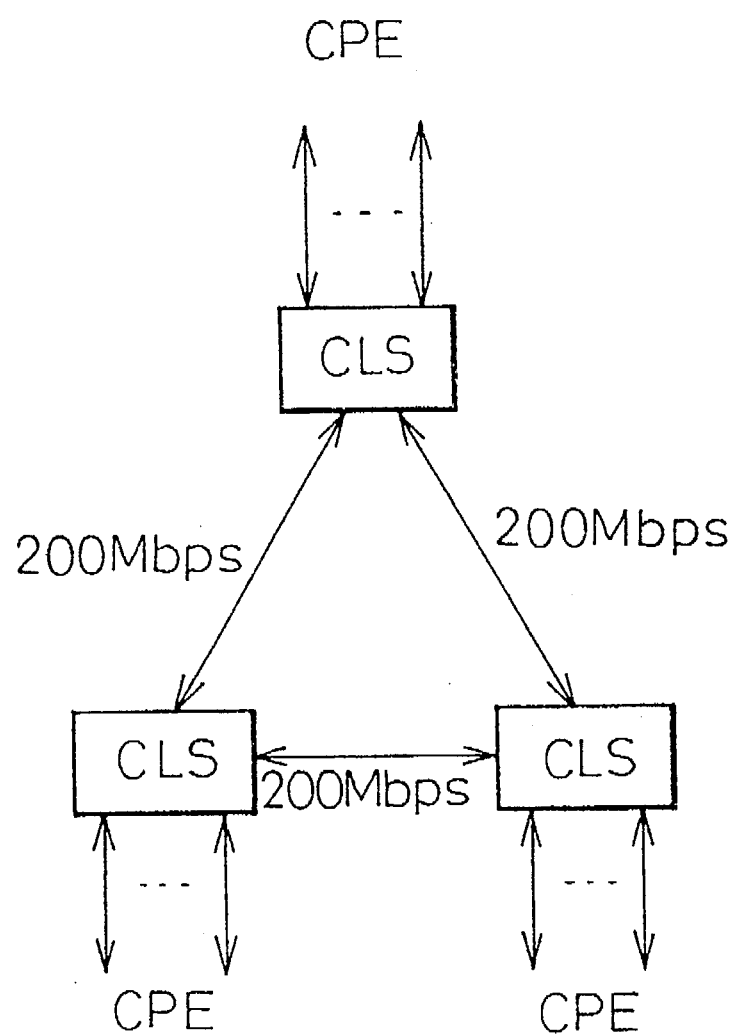
FIG. 2 is a diagram for explaining a second embodiment of the present invention.

In a second embodiment of the present invention, when the number of CLSs installed is denoted as n, and the transmission capacity of the transmission channel between one CLS and the ATM switch, that is, the transmission capacity of one CLS, is denoted by k, transmission between CLSs is controlled by the traffic shaper so that the transmission rate on each path set up between the CLSs does not exceed k/n. For example, when three CLSs, each with a transmission capacity of 600 Mbps, are installed, the maximum transmission rate on each path between the CLSs is controlled at 600/3=200 Mbps, as shown in FIG. 2 (the ATM switch between CLSs and between the CLSs and CPEs is not shown). Traffic can thus be distributed uniformly between the CLSs. The transmission capacity of k/n=200 Mbps is provided for the CLS-CPE path. This, however, does not necessarily mean that the sum of the transmission rates of the CPEs allocated to each CLS is limited to 200 Mbps; rather, the allocation may be done in an arbitrary manner. Therefore, there is a possibility that in a particular CLS the sum of the transmission rates between the CLS and the CPEs allocated to it and those between the CLS and other CLSs may exceed 600 Mbps, the transmission capacity of the CLS, and in that case, cell discarding will occur at the ATM layer. This, however, accomplishes the purpose of maintaining the fairness of service by distributing traffic uniformly among the CLSs. It is of course desirable that the CPEs be allocated so that the sum of the transmission rates of the CPEs allocated to each CLS is substantially equal among the CLSs, as in the first embodiment.

Figure 3:
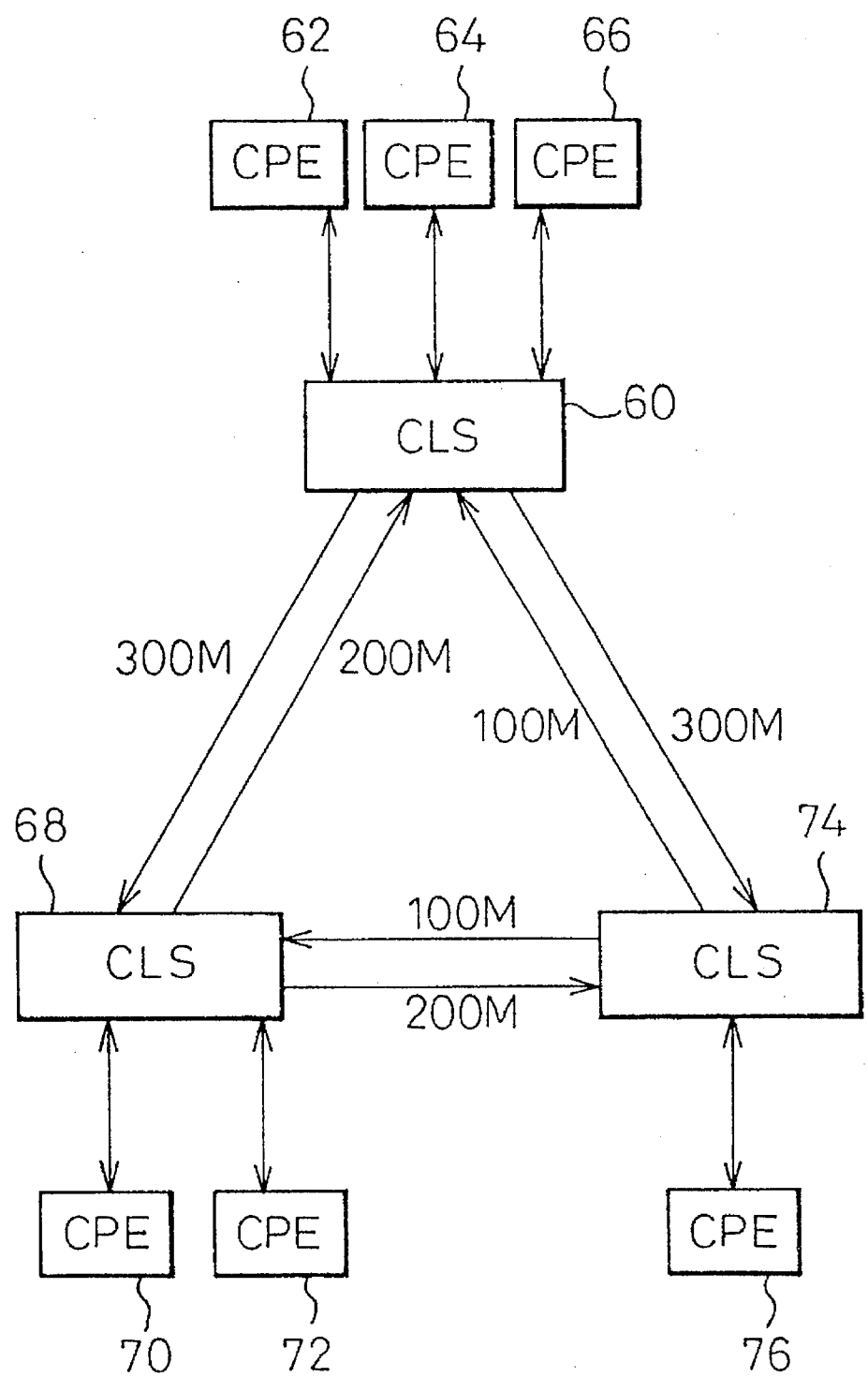
FIG. 3 is a diagram for explaining a third embodiment of the present invention.

In the third embodiment and some of the further embodiments of the present invention hereinafter described, description is given of how a control value for the transmission rate between CLSs is properly determined in accordance with the sum of the transmission rates of the CPEs allocated to each CLS when the CPEs are allocated to each CLS without giving consideration to making the sum of the transmission rates of the CPEs allocated to it substantially equal between CLSs, or when the sum of the transmission rates were not made substantially equal despite giving suitable consideration when allocating the CPEs. In the third embodiment of the invention, the control value for the transmission rate between CLSs is determined in accordance with the ratio of the number of CPEs (or subscribers) allocated to each CLS. The transmission rate of each CPE may be different, for example, 2 Mbps or 40 Mbps, but in this embodiment, such a difference is ignored, and emphasis is placed on the number of CPEs. For example, in FIG. 3, three CPEs 62, 64, and 66 are allocated to a CLS 60, two CPEs 70 and 72 are allocated to a CLS 68, and one CPE 76 is allocated to a CLS 74, the ratio among them being 3:2:1. Assuming the transmission capacity of each CLS is 600 Mbps, the path from CLS 60 to CLS 68 and the path from CLS 60 to CLS 74 are each given 600 Mbps×(3/(3+2+1))=300 Mbps. On the other hand, the path from CLS 68 to CLS 60 and the path from CLS 68 to CLS 74 are each given 600 Mbps×(2/(1+2+3))=200 Mbps. Likewise, the path from CLS 74 to CLS 60 and the path from CLS 74 to CLS 68 are each given 600 Mbps×(1/(1+2+3))=100 Mbps. The traffic shaper contained in each CLS controls the transmission of ATM cells sent out to the other CLSs so that the transmission rate does not exceed the control value thus determined for the CLS.

Figure 4A:
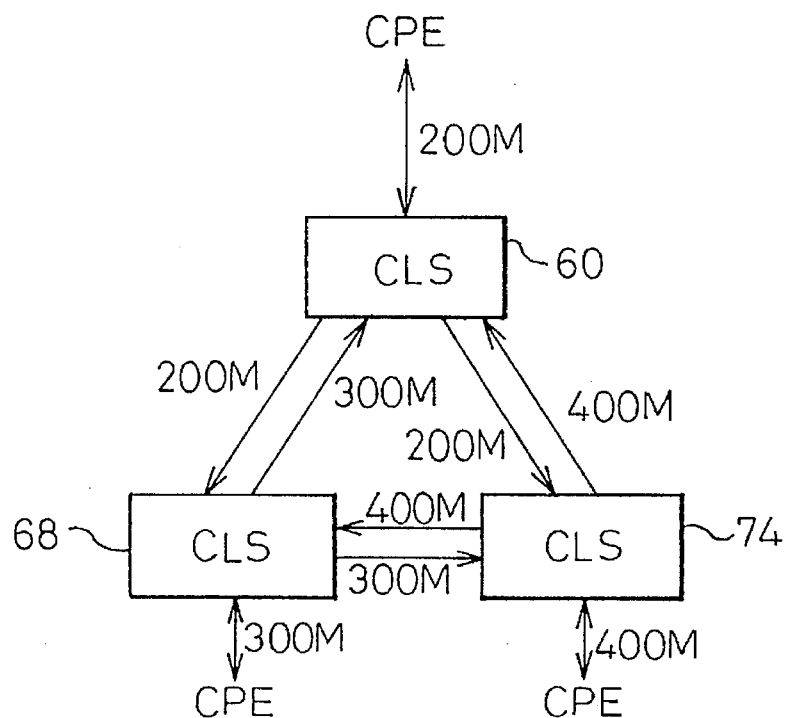
FIGS. 4A and 4B are diagrams for explaining a fourth embodiment of the present invention.
Figure 4B:
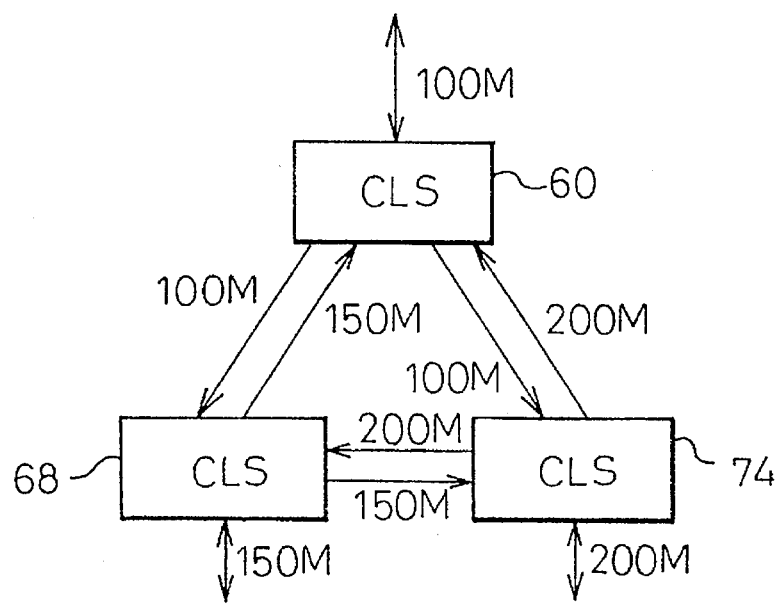

In the fourth embodiment of the invention, the control value for the transmission rate between CLSs is tentatively determined in accordance with the sum of the transmission rates of the CPEs allocated to each CLS, and if the tentative control value exceeds the transmission capacity of the CLS, the overall transmission rate is adjusted so that the control value does not exceed the transmission capacity. Suppose, for example, that the total transmission rates of the CPEs allocated to the CLSs 60, 68, and 74 are 200 Mbps, 300 Mbps, and 400 Mbps, respectively, as shown in FIG. 4A. In this case, the control value for the paths out from the CLS 60 to the other CLSs is set at 200 Mbps which is equal to the sum of the transmission rates of the CPEs allocated to the CLS 60. Similarly, the control value for the paths outgoing from the CLS 68 to the other CLSs is set at 300 Mbps, and the control value for the paths outgoing from the CLS 74 to the other CLSs is set at 400 Mbps. Next, in the traffic moving from each CLS to the other CLSs and to the CPEs allocated to it (via the ATM switch), a bottleneck is located where the traffic most exceeds the transmission capacity (600 Mbps) of the CLS. In the example of FIG. 4A, this corresponds to the outgoing paths from the CLS 74 (totaling 400×3=1200 Mbps). Then, the ratio (0.5) that reduces that value (1200 Mbps) to the transmission capacity (600 Mbps) is determined, and all other paths are multiplied by this ratio, to determine the final control values as shown in FIG. 4B. For the CLS 60, for example, 100 Mbps is allocated in FIG. 4B, though the sum of the transmission rates of the CPEs under its control is 200 Mbps. As previously stated, this does not necessarily mean that the sum of the transmission rates of the CPEs allocated to the CLS 60 is controlled to 100 Mbps.

Figure 5A:
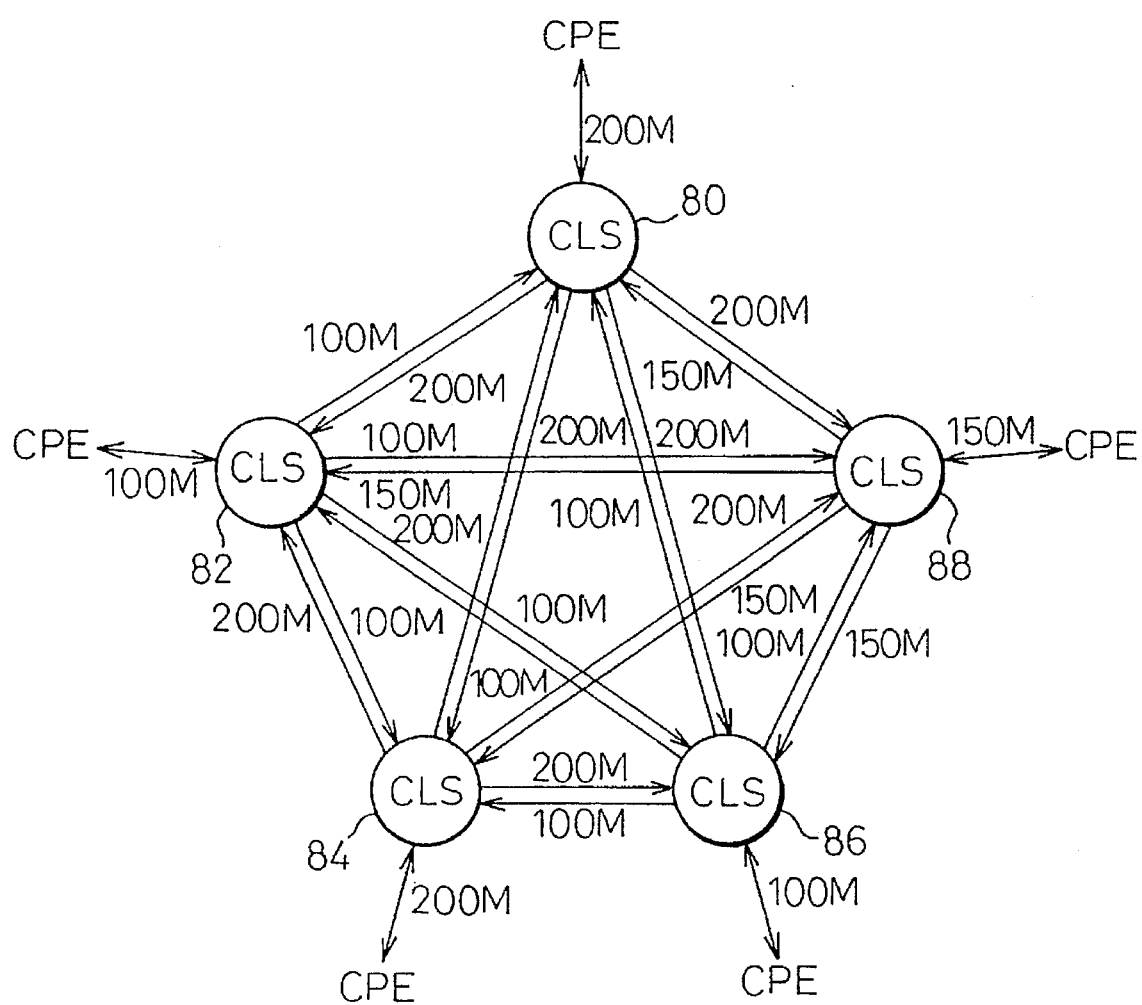
FIGS. 5A and 5B are diagrams for explaining a fifth embodiment of the present invention.

In the fifth embodiment of the invention, the transmission rate between CLSs is tentatively determined in accordance with the sum of the transmission rates of the CPEs allocated to each CLS, as in the fourth embodiment, and if the tentative control value exceeds the transmission capacity of the CLS, the transmission rate is adjusted for each CLS so that the control value does not exceed the transmission capacity. Suppose, for example, that five CLSs 80, 82, 84, 86, and 88 are installed, the total transmission rates requested by the CPEs allocated to them being 200 Mbps, 100 Mbps, 200 Mbps, 100 Mbps, and 150 Mbps, respectively, as shown in FIG. 5A. The control value for the transmission rate of each of the outgoing paths from each CLS is tentatively set at a value equal to the sum of the transmission rates of the CPEs allocated to it. As a result, the total transmission rates of the outgoing paths from the CLSs 80, 82, 84, 86, and 88 are 1000 Mbps, 500 Mbps, 1000 Mbps, 500 Mbps, and 750 Mbps, respectively, while the total transmission rates of the incoming paths to the CLSs 80, 82, 84, 86, and 88 are 550 Mbps, 650 Mbps, 550 Mbps, 650 Mbps, and 600 Mbps, respectively. The outgoing paths from the CLSs 80, 84, and 88 and the incoming paths to the CLSs 82 and 84 respectively exceed the transmission capacity of 600 Mbps.

Figure 5B:
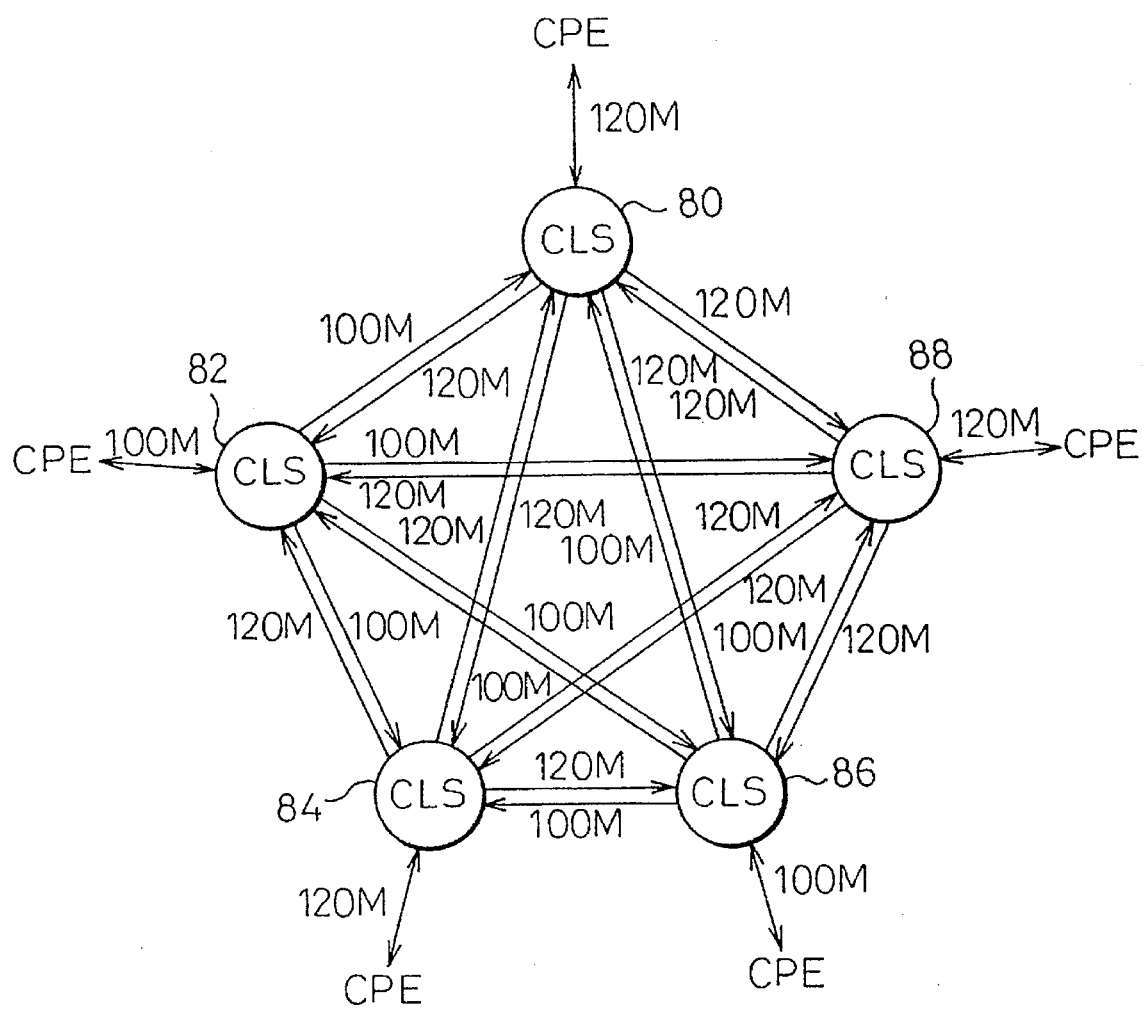

Next, for the CLSs 80, 84, and 88 for which the total transmission rates of the outgoing paths respectively exceed 600 Mbps, the control value for the transmission rate of each of the outgoing paths is changed to k/n, that is, 600/5=120 Mbps, as shown in FIG. 5B. As a result, not only the total transmission rate of the outgoing paths from each CLS but also the total transmission rate of the incoming paths from each CLS are held within 600 Mbps.

More specifically, the total transmission rates requested by the CPEs allocated to the respective CLSs (in the above example, 200 Mbps, 100 Mbps, 200 Mbps, 100 Mbps, and 150 Mbps, respectively) are each compared with k/n (in the above example, 120 Mbps). For any CLS whose total transmission rate is smaller than or equal to k/n, the sum of the transmission rates requested by the CPEs allocated to it is determined as the control value for the paths outgoing from that CLS to the other CLS; otherwise, k/n is determined as the control value. In the above example, 120 Mbps is allocated for the transmission rate for transmission between each of the CLSs 80, 84, and 88 and the CPEs allocated to them, but as previously stated, transmission to and from the CPEs is not necessarily controlled at or below this value.

FIG. 6 shows the configuration of the traffic shaper provided on an output highway within each CLS. In FIG. 6, 71 is a data sorter that recognizes the destination address contained in the header of an incoming cell and delivers the cell onto the signal line corresponding to the destination CLS or CPE; 72 are signal lines on which cells destined for CLS2-CLSi or CPEs are transferred; 73 are cell buffers constructed from FIFO (first-in-first-out) memory for storing cells destined for CLS2-CLSi or CPEs; 74 are monitors for monitoring the cells entering the respective cell buffers 73; 75 are cell readout devices for reading out cells from the respective cell buffers 74; and 76 is a data multiplexer that multiplexes the cells read out of the cell readout devices 75 for output onto a highway (transmission channel) to the ATM switch (11 in FIG. 2).

Cells for transmission from the CLS to other CLSs or CPEs allocated to it via the ATM switch are fed into the data sorter 71 which sorts the cells by destination and supplies them to the respective cell buffers 73. The control value for the transmission rate determined by the band management section 54 in the CPR 44 (FIG. 1) is set in each cell readout device 75, which, when there are cells held in the associated cell buffer 73, reads out the cells at the specified transmission rate for input into the data multiplexer 76. When the speed at which the cells are input into the cell buffer 73 is higher than the readout speed of the cell readout device 75, the amount of data held in the cell buffer 73 increases. If this condition continues for a certain length of time and the cell buffer 73 becomes full, subsequently arriving cells are discarded. The data multiplexer 76 statistically multiplexes cells from the cell readout devices 75 for transmission to the ATM switch 10.

In still another embodiment of the invention, each monitor 74 monitors the number of cells arriving at the associated cell buffer 73 per unit time; then, the average number of arrivals is calculated, and in accordance with the calculated average value, the readout speed of the associated readout device is set or reset. In this embodiment, the result of monitoring by each monitor 74 is notified to the band management section 54 in the CPR 44 (FIG. 1). Based on the notified data, the band management section 44 creates a data management table such as shown in FIG. 7, and calculates the average value over a predetermined period of time, for example, over a period of one week for each time segment of the day. From the following week onward, at each transition from one time segment to the next the average value of the preceding week for the corresponding time segment is set in the cell readout device 75 as the control value.

We claim:

1. A method of controlling data transmission between a plurality of connectionless servers to which terminals requesting a connectionless service are allocated, comprising the steps of:
   determining allocation of the terminals so that the sum of the transmission rates requested by the terminals allocated to each connectionless server is substantially equal among the connectionless servers; and
   setting up a virtual path between each connectionless server and each of the terminals allocated thereto.

2. A method according to claim 1, wherein the connectionless servers and the terminals are connected to an ATM switch that provides virtual paths between the connectionless servers and between each connectionless server and each of the terminals allocated thereto.

3. A method of controlling data transmission between a plurality of connectionless servers to which terminals requesting a connectionless service are allocated, comprising the steps of:
   determining a control value for a maximum transmission rate at which data can be transmitted between the connectionless servers; and
   performing traffic shaping between the connectionless servers so that the transmission rate of the data transmitted between the connectionless servers does not exceed the control value.

4. A method of controlling data transmission between a plurality of connectionless servers to which terminals requesting a connectionless service are allocated, comprising the steps of:
   determining a control value for a transmission rate at which data can be transmitted between the connectionless servers; and
   performing traffic shaping between the connectionless servers so that the transmission rate of the data transmitted between the connectionless servers does not exceed the control value,
   wherein the connectionless servers and the terminals are connected to an ATM switch that provides virtual paths between the connectionless servers and between each connectionless server and each of the terminals allocated thereto.

5. A method according to claim 4, wherein in the step of determining the control value, the control value for each connectionless server is determined by dividing the transmission capacity of the connectionless server by the total number of connectionless servers installed.

6. A method according to claim 4, wherein, in the step of determining the control value, the control value for the transmission rate at which data can be transmitted from one connectionless server to the other connectionless servers is determined so that the ratio of the control values assigned to the respective connectionless servers becomes equal to the ratio of the numbers of terminals allocated to them.

7. A method according to claim 4, wherein the step of determining the control value includes the substeps of:
   tentatively determining the sum of the transmission rates requested by the terminals allocated to each connectionless server as the control value for the transmission rate at which data can be transmitted from the connectionless server to other connectionless servers, and
   changing the control value in such a manner that when the total of the sum of the control values for the data to be transmitted from the connectionless server to other connectionless servers and the sum of the transmission rates requested by the terminals allocated to the connectionless server exceeds the transmission capacity of the connectionless server, each control value is multiplied by a ratio so determined as to reduce the total control value of the connectionless server, that provides a larger total control value than any other connectionless server, to the transmission capacity of the connectionless server.

8. A method according to claim 4, wherein in the step of determining the control value, when the sum of the transmission rates requested by the terminals allocated to each connectionless server is smaller than a control value obtained by dividing the transmission capacity of the connectionless server by the total number of connectionless servers installed, said sum is determined as the control value for the data to be transmitted from the connectionless server to other connectionless servers, and when said sum is larger than said value, said value is determined as the control value for the data to be transmitted from the connectionless server to other connectionless servers.

9. A method according to claim 4, wherein the step of determining the control value includes the substeps of:
   measuring the transmission rate for each destination on an output highway in each connectionless server;
   averaging the measured transmission rate over a predetermined period of time for each destination and for each time segment of the day; and
   determining the averaged transmission rate as the control value for the destination in the corresponding time segment.

10. An apparatus for controlling data transmission between a plurality of connectionless servers to which terminals requesting a connectionless service are allocated, comprising:
    means for determining allocation of the terminals so that the sum of the transmission rates requested by the terminals allocated to each connectionless server is substantially equal among the connectionless servers; and
    means for setting up a virtual path between each connectionless server and a terminal allocated thereto.

11. An apparatus according to claim 10, wherein the connectionless servers and the terminals are connected to an ATM switch that provides virtual paths between the connectionless servers and between each connectionless server and each of the terminals allocated thereto.

12. An apparatus for controlling data transmission between a plurality of connectionless servers to which terminals requesting a connectionless service are allocated, comprising:

means for determining a control value for a maximum transmission rate at which data can be transmitted between the connectionless servers; and means for performing traffic shaping between the connectionless servers so that the transmission rate of the data transmitted between the connectionless servers does not exceed the control value.

13. An apparatus for controlling data transmission between a plurality of connectionless servers to which terminals requesting a connectionless service are allocated, comprising:

means for determining a control value for a transmission rate at which data can be transmitted between the connectionless servers; and means for performing traffic shaping between the connectionless servers so that the transmission rate of the date transmitted between the connectionless servers does not exceed the control value, wherein the connectionless servers and the terminals are connected to an ATM switch that provides virtual paths between the connectionless servers and between each connectionless server and each of the terminals allocated thereto.

14. An apparatus according to claim 13, wherein the control value determining means determines the control value for each connectionless server by dividing the transmission capacity of the connectionless server by the total number of connectionless servers installed.

15. An apparatus according to claim 13, wherein the control value determining means determines the control value for the transmission rate at which data can be transmitted from one connectionless server to other connectionless servers, so that the ratio of the control values assigned to the respective connectionless servers becomes equal to the ratio of the numbers of terminals allocated to them.

16. An apparatus according to claim 13, wherein the control value determining means includes:

means for tentatively determining the sum of the transmission rates requested by the terminals allocated to each connectionless server as the control value for the transmission rate at which data can be transmitted from the connectionless server to other connectionless servers, and means for changing the control value in such a manner that when the total of the sum of the control values for the data to be transmitted from the connectionless server to other connectionless servers and the sum of the transmission rates requested by the terminals allocated to the connectionless server exceeds the transmission capacity of the connectionless server, each control value is multiplied by a ratio so determined as to reduce the total control value of the connectionless server, that provides a larger total control value than any other connectionless server, to the transmission capacity of the connectionless server.

17. An apparatus according to claim 13, wherein when the sum of the transmission rates requested by the terminals allocated to each connectionless server is smaller than a value obtained by dividing the transmission capacity of the connectionless server by the total number of connectionless servers installed, the control value determining means determines said sum as the control value for the data to be transmitted from the connectionless server to other connectionless servers, and when said sum is larger than said control value, determines said control value as the control value for the data to be transmitted from the connectionless server to other connectionless servers.

18. An apparatus according to claim 13, wherein the control value determining means includes:

means for measuring the transmission rate for each destination on an output highway in each connectionless server;

means for averaging the measured transmission rate over a predetermined period of time for each destination and for each time segment of the day; and means for determining the averaged transmission rate as the control value for the destination in the corresponding time segment.

* * * * *